June 26, 1956 — A. E. BLOMQUIST — 2,751,959
VEHICLE WHEEL
Filed June 11, 1953 — 4 Sheets-Sheet 1

INVENTOR.
ALBERT E. BLOMQUIST
BY Kenyon & Kenyon
ATTORNEYS

June 26, 1956 A. E. BLOMQUIST 2,751,959
VEHICLE WHEEL

Filed June 11, 1953 4 Sheets-Sheet 2

INVENTOR.
ALBERT E. BLOMQUIST
BY
Kenyon & Kenyon
ATTORNEYS

June 26, 1956     A. E. BLOMQUIST     2,751,959
VEHICLE WHEEL

Filed June 11, 1953     4 Sheets-Sheet 3

INVENTOR.
ALBERT E. BLOMQUIST
BY
Kenyon & Kenyon
ATTORNEYS

June 26, 1956 A. E. BLOMQUIST 2,751,959
VEHICLE WHEEL
Filed June 11, 1953 4 Sheets-Sheet 4

INVENTOR.
ALBERT E. BLOMQUIST
BY
Kenyon & Kenyon
ATTORNEYS

United States Patent Office 2,751,959
Patented June 26, 1956

2,751,959

VEHICLE WHEEL

Albert E. Blomquist, Ringoes, N. J., assignor to Fairchild Engine and Airplane Corporation, Hagerstown, Md., a corporation of Maryland Application June 11, 1953, Serial No. 360,908

19 Claims. (Cl. 152—416)

This invention relates to vehicle wheels and relates especially to vehicle wheels adapted to have a plurality of tires mounted thereon.

It is an object of this invention to provide a vehicle wheel having improved utility and a greater scope of functional attributes as compared with conventional vehicle wheels.

It is a feature of this invention that a vehicle wheel is provided such that two tires are adapted to be mounted thereon in adjacent relation for rotation about a common axis in combination with means for mounting a third tire for rotation about the same axis while disposed between the other two tires, the third tire being a pneumatic tire which can be put into and out of use by inflating or deflating it.

According to further features of this invention the third pneumatic tire which is mounted between the other two tires is such that its width from side wall to side wall can be very substantially decreased upon deflating the tire. This collapsibility can be made to be quite substantial by providing the third pneumatic tire with a plurality of annular tread portions having tread material therebetween that is adapted to be folded inwardly when the pneumatic third tire is deflated and axially collapsed. By securing the tires on the opposite sides of the pneumatic tire to rim means mounted for rotation about the same axis while permitting relative axial movement therebetween, the tires on the opposite sides of the pneumatic tire may be maintained in adjacent proximate relation therewith whether the pneumatic tire is in the inflated and expanded condition or is in the deflated and collapsed condition. Preferably, the pneumatic tire is mounted so that one side wall thereof is secured to a rim means to which a tire on one side thereof is attached while the other side wall is secured to another rim means to which the tire on the other side thereof is attached.

It is apparent from the foregoing that according to this invention a novel wheel construction is afforded which under normal conditions functions essentially the same as a double tire wheel. However, if soft terrain is encountered such as swampy ground, the traction surface of the wheel can be greatly increased by causing the third pneumatic tire to become inflated and by increasing the spacing between the first and second tires to accommodate the pneumatic tire in its inflated condition. Such inflation of the pneumatic tire may also be availed of in the case of certain vehicles adapted for amphibious usages for providing a pontoon-like body which serves to affect very substantially the buoyancy of the wheel and of the vehicle to which the wheel is attached. When no longer needed, the pneumatic tire may be deflated and collapsed between the other two tires which are returned to their normal more adjacent position. These unique attributes of the vehicle wheel of this invention make it especially suited for use on many types of military vehicles although it is also adapted for other uses, as for example, on earth moving equipment.

Further features of this invention relate to the combination with the relatively movable rim members and tires secured thereto of power actuated means for effecting relative movement of the rim members, such as a motor secured to one of the rim members. Whenever it is desired to vary the spacing between the rim members, the motor may be caused to rotate in either one direction or the other. Such rotation preferably is transmitted to a threaded part the axis of the threads of which is in the direction of the axis of rotation of the wheel and which is in threaded engagement with another threaded part that is held in spaced axial position relation to the other rim member whereby, upon actuation of the motor, the part rotated by the motor is rotated relatively to the other part and the spacing of the rim members from each other is automatically changed as desired.

This invention also lends itself to a wheel construction wherein a wheel unit is employed which not only has the structure aforesaid but also comprises a driving motor, namely, a motor which, together with other similar wheels each of which comprises a driving motor, is used for propelling the vehicle. In such case rim members are mounted for rotation and so that they are driven by the driving motor, one of the rim members being driven directly from the motor in axially fixed relation thereto. Ordinarily, one of the rim members is maintained in fixed axial position relative to the driving motor, and the other rim member is movable relatively thereto by the motor that is actuatable to vary the spacing of the rim members and that may be secured to either one of the relatively movable rim members.

Preferably one of the threaded parts which are relatively rotatable to vary the spacing of the rim members is in the form of a hollow externally threaded shaft within which there is comprised an air line that is connected at one end with conduit means communicating with the interior of the pneumatic tire and that is connected at the other end with conduit means communicating with means for inflating and deflating the pneumatic tire. This air line may likewise provide a housing for electrical conductor means communicating between the motor that is actuatable to vary the spacing between the rim members and a source of electric current. The air line may comprise telescoping members whereby its axial extent may be varied and the electrical conductors encased therein may likewise comprise telescoping members.

Other features of this invention relate to rim construction comprising a plurality of annular telescoping members such that their relative rotation is prevented while relative axial movement may be varied.

Further objects, features and advantages of the invention will be apparent from the following description of certain typical embodiments of the invention which have been shown for illustrative purposes in the accompanying drawings, wherein—

Fig. 6 is a side elevation on an enlarged scale and partly in section showing in greater detail part of the means of Fig. 5 for varying the spacing of the rim members; and Fig. 7 is the section of the combined air line and housing for electrical conductor means which is taken on the line 7—7 of Fig. 6.

Figure 1:
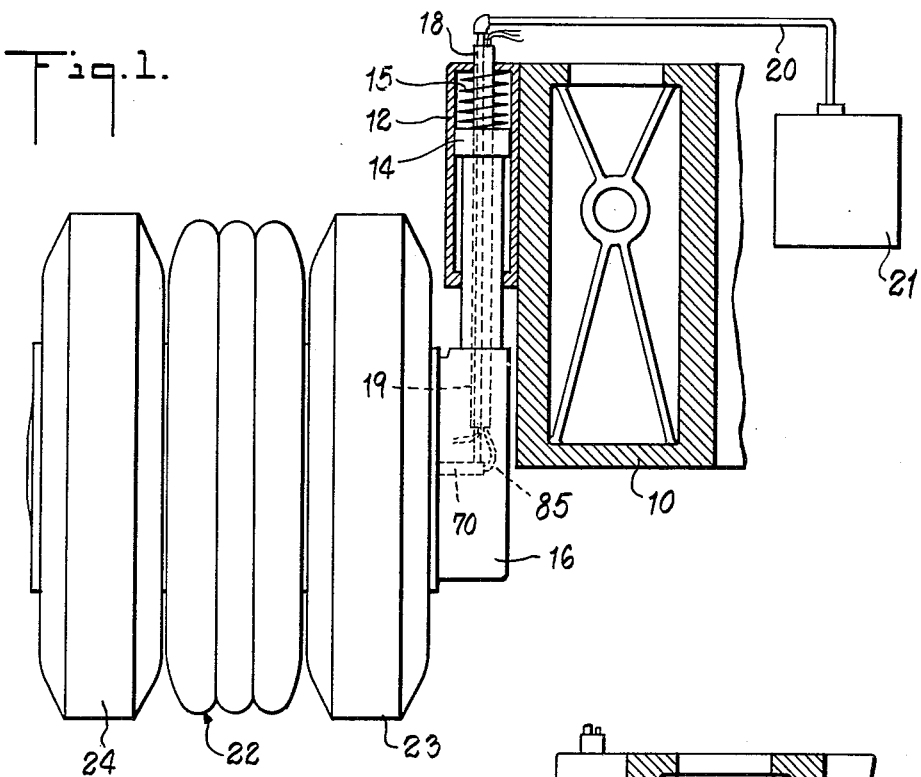
Fig. 1 is a side elevation with certain parts in section of a vehicle wheel embodying this invention that is shown in secured relation to a frame member of a vehicle, the wheel being in contracted position with the middle pneumatic tire deflated and collapsed.
Figure 2:
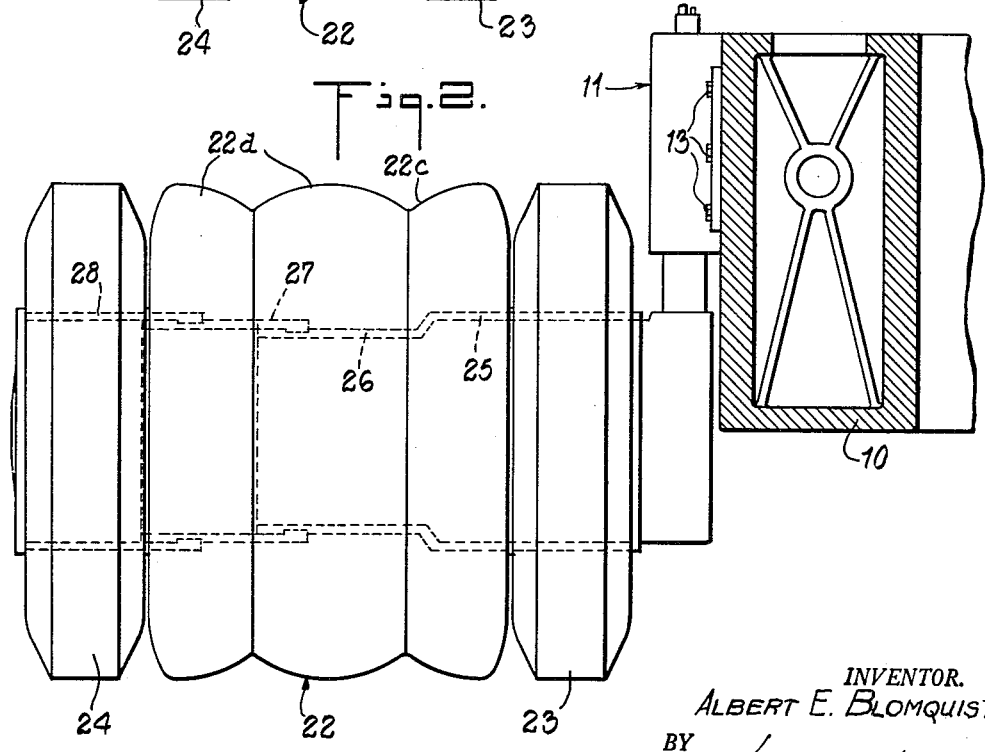
Fig. 2 is similar to Fig. 1 except that the wheel is shown in expanded position with the middle pneumatic tire inflated.

While the vehicle wheel of this invention is adapted for being secured to the vehicle in any suitable way, the vehicle wheel of this invention has been illustrated in the accompanying drawings as being that type which comprises within the wheel itself motor means for rotating the wheel in order to propel the vehicle. While only one such wheel is shown in the drawings, it is to be assumed that any vehicle would be equipped with a plurality of such wheels.

Referring to Figs. 1 to 4, the vehicle wheel is shown secured to the frame element 10 of a vehicle with shock absorbing means interposed between the wheel and the frame 10. The shock absorbing means is indicated generally by the reference character 11. Any type of shock absorbing means may be employed. That shown for purposes of illustration in the drawings comprises the cylinder 12 which may be firmly secured to the frame element 10 as by the bolts 13. The cylinder 12 serves as a guide for firmly holding in slidably aligned relation therewith the piston 14. Suitable resilient means such as the spring 15 may be interposed between the upper end of the piston 14 and the top of the cylinder 12 for absorbing road shocks. The lower end of the piston 12 is firmly secured to the motor housing 16, and the rim means on which the tires are carried are rotatably mounted with reference to the motor housing 16 as will be described hereinbelow more in detail.

Figure 3:
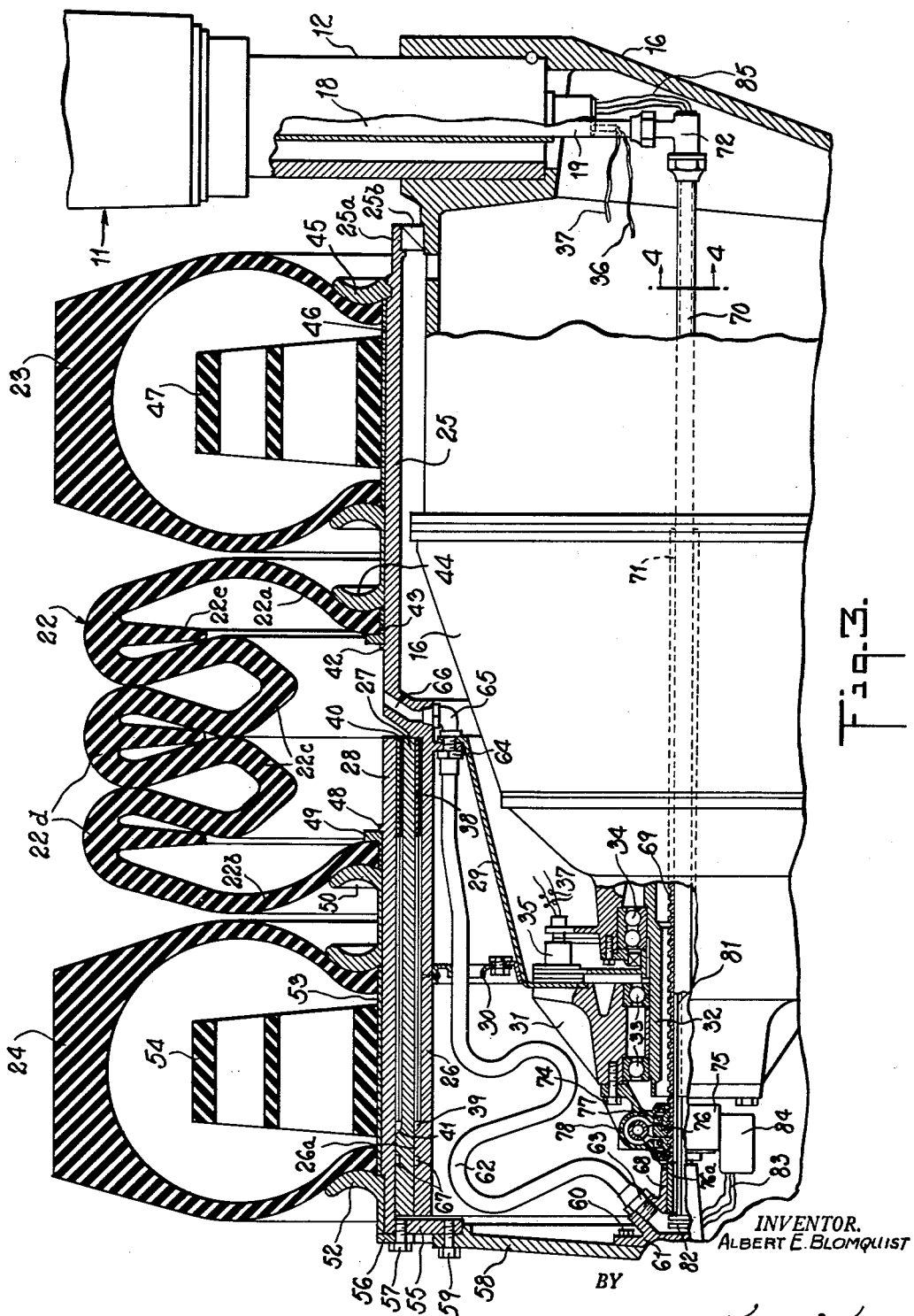
Fig. 3 is a vertical elevation largely in section in the plane of the wheel axis.

The tubular member 18 extends throughout the length of the cylinder 12 and of the piston 14 in fixed relation to the piston 14 and in slidable relation to the cylinder 12. This tubular member 18 provides a housing through which there may be introduced to the interior of the motor housing 16 an air conduit for inflating and deflating the pneumatic tire as well as suitable electrical conductors for the motor means employed and for controls. As shown in Figs. 1 and 3 the tubular member 18 houses the air conduit 19 which is connected at its upper end to the air line 20 that is in communication with the means 21 for supplying compressed air or for withdrawing air from the collapsible pneumatic tire. For example, a suitable reversible air pump can be used for the purpose.

In Fig. 1 the wheel is shown in that condition which is appropriate for normal driving conditions. In this figure the wheel structure is shown in contracted position with the pneumatic tire 22 deflated and axially collapsed between the permanent tires 23 and 24. In such condition the tread of the pneumatic tire 22 does not contact the ground surface except for occasional stones or irregularities and the wear is taken substantially entirely by the tires 23 and 24. If it is desired to increase the traction surface then the wheel is such that it may be extended so that the tires 23 and 24 are in the relative position shown in Fig. 2, the pneumatic tire 22 being expanded and inflated so as to provide the additional very substantial amount of traction surface. These operations can be effected automatically as will be described hereinbelow in connection with the following examples of the practice of this invention.

Figure 4:
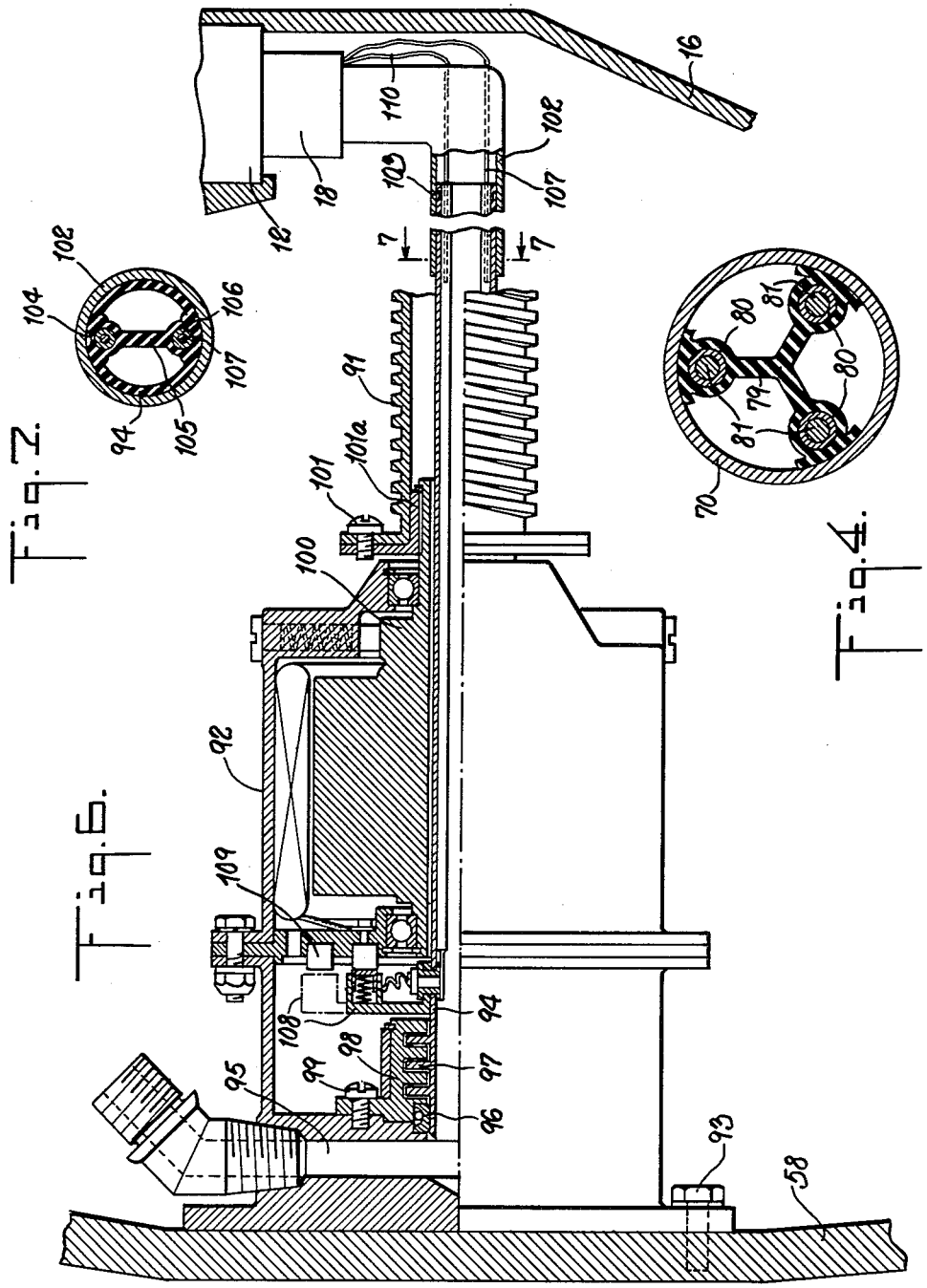
Fig. 4 is an enlarged sectional view of the combined air line and housing for electric conductor means which is taken on the line 4—4 of Fig. 3.

Referring to the embodiment which is shown in Figs. 3 and 4, the permanent tires 23 and 24 as well as the pneumatic tire 22 are mounted for rotation about the wheel axis. There are a plurality of rim members which are disposed in axially slidable relation so as to permit the expansion and contraction of the wheel as has been illustrated in connection with Figs. 1 and 2. The tire 23 is mounted on the rim member 25 that has the extension 26 which is offset from the rim member 25 and relative to which the rim members 27 and 28 are mounted in longitudinally slidable relation. The tire 24 is mounted on the rim member 28. The rim members as a unit are secured to the supporting webs 29 and 30 which in turn are secured to the member 31 that is rotatably mounted about the driven member 32 by means of the bearings 33. The driven member 32 is maintained firmly in axially aligned position relative to the motor housing 16 by the bearings 34 (as well as by additional bearings not shown). The driven member 32 is rotatably driven relative to the motor housing by means of a motor (not shown) within the housing 16. If desired, the driving force supplied by the motor within the housing 16 may be transmitted to the member 31 and to the rim members by the actuation of a magnetic clutch which has been indicated at 35. However, any other suitable means may be employed. Suitable electrical conductors for supplying power to the driving motor may be taken thereto through the tubular member 18 which passes up through the shock absorber 11 as hereinabove described. Thus, for the purposes of illustration electrical conductors 36 have been shown in Fig. 3, for supplying power to the driving motor and conductors 37 have been shown for actuating a magnetic clutch 35. It is apparent from the foregoing that the rim members are mounted for rotation about the motor housing 16 and that the vehicle driving power may be supplied by actuating the motor within the motor housing so as to cause the rim members to rotate about the housing.

The right-hand end of the rim member 27 is provided with an inner sleeve member 38 which is secured thereto as by being press fitted therewith and riveted after the rim member 27 has been slid into position over the extension 26 of the rim member 25. The inner sleeve member 38 may be split so that in assembly it may be passed over the left-hand end of the extension 26; or, alternatively, the left-hand end of the extension 26 may comprise the sleeve 26a which is put in place by a press fit after the sleeve member 38 has been placed on the extension 26. The under surface of this sleeve member 38 and the outer surface presented by the extension 26 of the rim member 25 are provided with coacting splines so that the sleeve member 38 and the rim member 27 are rotated as a unit with the rim member 25 while being axially slidable relative thereto. The telescopic movement of rim member 27 relative to the extension 26 is limited by the stop 39 and the edge of the sleeve member 38. Similarly, the inner end of the rim member 28 is provided with the sleeve member 40 which is secured thereto and the inner surface of which presents splines that coact with splines presented by the periphery of the rim member 27 so that the rim member 28 likewise is rotated with rim member 25 when rim member 25 is rotated from the driven member 32 while being axially movable relative thereto. The axial movement of the rim member 28 is limited by the stop surface 41 against which the edge of the sleeve member 40 comes into contact when the limit of extension is reached.

By the foregoing arrangement a plurality of rim members is provided which are rotatable as a unit but which are capable of relative axial movement so that the overall length of the tire mounting means provided by the rim members can be lengthened and shortened as desired.

In Fig. 3 the different rim portions are shown in that position occupied by them when the wheel is contracted. When the wheel is expanded, then the rim members assume the relative positions which have been shown more or less diagrammatically in Fig. 2. When the parts are in the position of Fig. 3, it is to be noted that the tread material at 22c between the tread portions 22d is adapted to fold inwardly to the collapsed position shown. The tire 22 includes the internal reinforcing ribs 22e for preventing this tire from ballooning when inflated and from crumpling when deflated.

The manner of holding the tires on the respective rim members will now be described with particular reference to Fig. 3. The rim member 25 is provided with a small stop annulus 42. One side wall 22a of the pneumatic tire 22 is held between the annular ring member 43 and the side wall retaining ring 44, the opposite surface of which also retains one of the side walls of the tire 23. The other side wall of the tire 23 is retained by the side wall split retaining ring 45. Between the side wall retaining ring 44 and the side wall split retaining ring 45 there is the spacer 46. The spacer 46 may, if desired, be provided with a rubber tire core 47 secured thereto so as to provide support in case the tire 23 should become deflated accidentally because of a puncture or blowout. The parts thus far described are assembled from the inner end 25a of the rim member 25 and when assembled there is a snug fit between the parts between the stop annulus 42 and the side wall split retaining member 45. The side wall retaining member 45 is split so that it may be snapped into place and so that it can be removed when desired. A suitable dust-excluding and watertight packing 25b is provided between the inner end 25a of the rim member 25 and the motor housing 16.

Parts corresponding to those hereinabove described wtih reference to the tire mounting means carried by the rim member 25 are duplicated in connection with the rim member 28. Thus, there is the stop annulus 48; and the side wall 22b of the pneumatic tire 22 is disposed between the rim member 49 and the side wall retaining member 50 which also retains one of the side walls of the tire 24. The other side wall of the tire 24 is retained by the side wall retaining member 52; and between the members 50 and 52 there is the annular spacer ring 53 to which the rubber core 54 is secured. The rim member 28 has the inturned flange portion 55 to which is bolted the retaining ring 56 by the bolts 57.

The hub member 58 is also secured to the flange 55 by the bolts 59. In the central portion secured to the inner surface of the hub 58 by the bolts 60 is the casting 61 which is hollow in the interior so as to permit the passage of air therethrough. A flexible air line 62 is secured to the casting 61 by the union 63. The other end of the flexible air line 62 is connected by the union 64 to the elbow 65 which communicates with the passage 66 in the rim member 25. In this way an air conduit is provided between the interior of the pneumatic tire 22 and the interior of the casting 61. Introduction of air into the pneumatic tire 22 through this conduit will cause the tire 22 to become inflated. In order to prevent escape of air from the tire 22 between the rim members air seals 67 are provided.

Rigidly secured to the boss 68 of the casting 61 is the externally threaded jack shaft 69. The inner surface of the jack shaft 69 is telescopically slidable with reference to the air tube 70. An air seal 71 may be provided between the outer surface of the tube 70 and the inner surface of the jack shaft 69 so that these parts may be moved both rotationally and longitudinally relative to each other while maintaining the parts in a substantially airtight relationship. The air line 70 is connected by the elbow 72 to the air conduit 19 which passes up through the tubular member 18 within the shock absorber so as to provide communication with the means 21 for supplying compressed air to the pneumatic tire 22 to inflate it or for withdrawing air from the tire 22 so as to cause it to become deflated.

Attached to the forward end of the member 31 by the bolts 74 is the jack nut and screw housing 75. The jack nut 76 is internally threaded so as to conform with the external threading of the jack shaft 69, is actuated by worm screw 76a and is rotatably mounted relative to the part 75 by the bearings 77. The jack nut 76 is rotatable relative to the part 75 by the motor 78 which is secured to the part 75 so that when the motor is actuated the jack nut 76 is rotated relative to the jack shaft 69 by the worm screw 76a.

The power for operating the motor 78 may be supplied by electrical conduit means which is disposed within the air tube 70 and which comprises telescopically slidable parts so as to permit the expansion and contraction of the wheel. Fig. 4 is a detail view illustrating a suitable structure. Within the air conduit 70 there is press fitted an elongated spider insert which is indicated generally by the reference character 79. The body portion of the insert 79 is composed of some suitable non-conducting material such as a plastic. Encased within the plastic are the elongated sleeves 80 of a suitable conducting material such as copper. Telescopically slidable within the sleeves 80 are the rods 81 of some suitable conducting material such as copper by which contact is maintained with the sleeves 80. The rods 81 are attached to the commutator ring member 82 within the casting 61 so that whereas the commutator ring 82 remains stationary electric current can be taken therefrom by use of brushes or the like connected to the lines 83 notwithstanding the rotation of the wheel relative to the commutator ring. The commutator ring member 82 is suitably apertured so that air can freely pass from the jack shaft 69 through the casting 61 to the flexible air line 62. The lines 83 lead to the switch box 84 which is operatively connected with the motor 78. The sleeves 80 are connected at their inner ends to the electrical conductors 85 which pass up through the tubular member 18 within shock absorber 11 as hereinabove described. Two of the electrical conductor means within the air conduit 70 may be employed for supplying power to the jack motor 78 and a third electrical conductor means may be used to operate a control whereby the motor 78 may be operated in either direction or stopped whenever it may be desirable to do so. Preferably means is provided so that the operation of the jack motor is stopped automatically when the desired limits for expanding and contracting the wheel have been reached.

The operation of the device which has been described hereinabove in connection with Figs. 1 to 4 is believed to be apparent. Under normal conditions the vehicle wheel is operated when contracted so as to be in the position shown in Figs. 1 and 3. In such case by use of the motor within the motor housing 16 power can be supplied for rotating the vehicle wheel and propelling the vehicle. It is to be noted that while there are a plurality of rim members, they are all rotationally driven as a unit by the principal driving motor of the wheel notwithstanding the fact that the individual rim members are capable of axial movement relative to each other. If it is desired to bring the third or pneumatic tire 22 into use then all that is required is for the operator to start the operation of the motor 78 which rotates the jack nut 76 in that direction which forces the tire 24 away from the tire 23. At the same time air under pressure can be supplied to the tire 22 from the source 21 through the air conduit means above described. After the tire 22 has been inflated, the parts assume the position indicated in Fig. 2. Conversely, whenever it is desired to throw the pneumatic tire 22 out of use, then the operator can effect this result merely by withdrawing the air from the tire 22 and by causing the motor 78 to rotate for turning the jack nut 76 in that direction which causes the jack shaft 69 to be moved to the right, thus contracting the wheel and restoring it to the position shown in Figs. 1 and 2.

Figure 5:
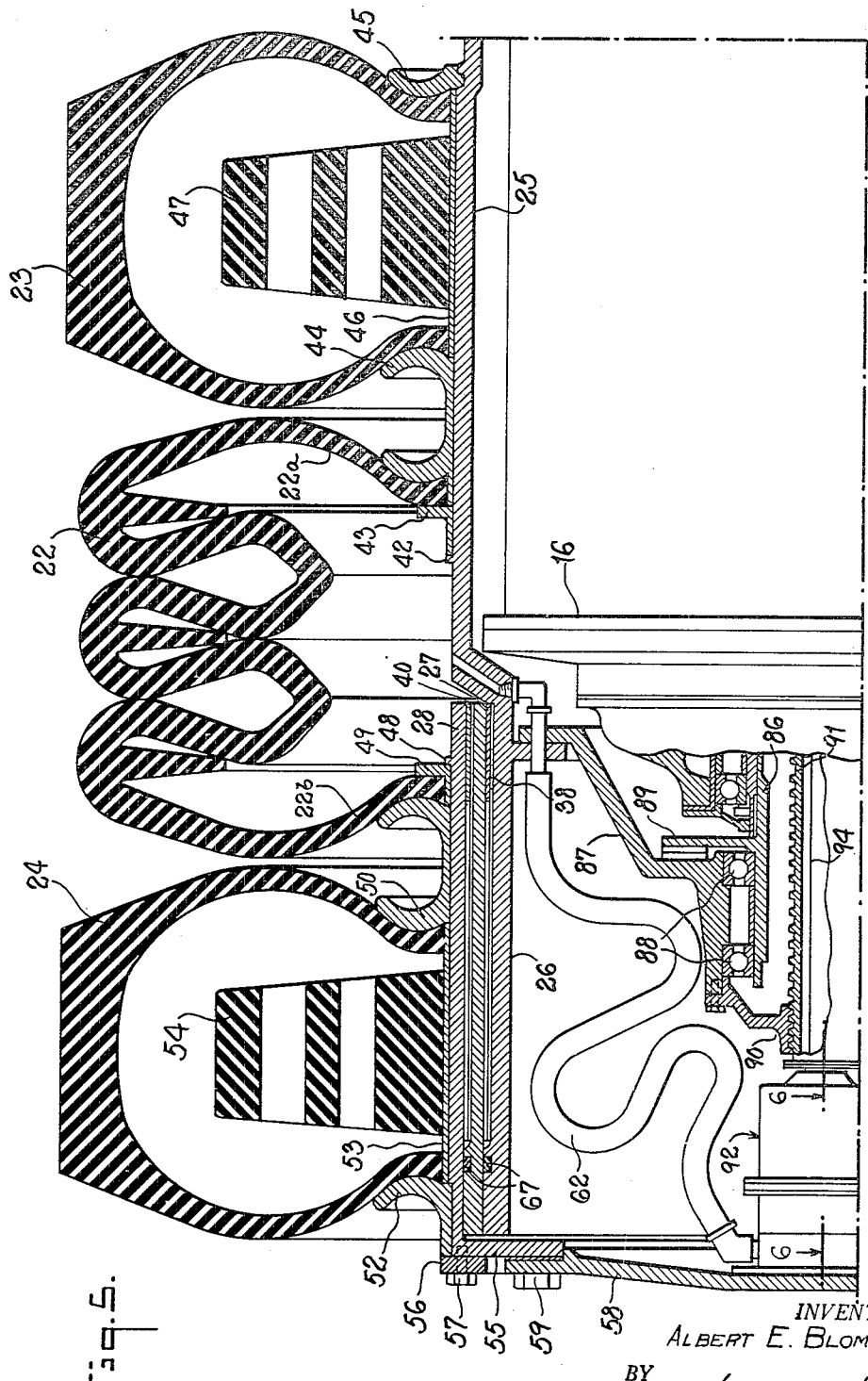
Fig. 5 is a vertical elevation similar to Fig. 3 showing alternative construction principally affecting the means for varying the spacing of the rim members.

An alternative embodiment of this invention is shown in Figs. 5, 6 and 7. As indicated in the drawings the vehicle wheel may be essentially of the same type as that shown in Figs. 1 to 4 in that the wheel comprises a driving motor comprised in the motor housing 16 which is secured to the vehicle frame as by the piston 12 in the manner hereinabove illustrated and described in connection with Figs. 1, 2 and 3.

The rim members 25, 27 and 28 are likewise essentially the same as described hereinabove in connection with Figs. 1 to 4 and the same is also true as regards the tires 22, 23 and 24 and the mounting means therefor, all of which have been indicated by the same reference characters as the corresponding parts shown in Figs. 1 to 4.

The primary difference between Figs. 5 to 7 as compared with Figs. 1 to 4 is that according to Figs. 5 to 7 the jack motor is carried by the wheel hub and rotates the jack shaft. The jack nut is in permanently secured relation with reference to the rim member 25.

As mentioned above the motor housing 16 encloses a driving motor which upon actuation causes the rotation of the driven member 86. The rim members are rotatably mounted for rotation about the driven member 86 utilizing the cone support 87, the periphery of which is secured to the extension 26 of the rim member 25. The bearings 88 are interposed between the cone support 87 and the driven member 86 and a magnetic clutch 89 is actuatable so that the rim members may be caused to rotate with the driven member 86 when the magnetic clutch is in engagement with the cone support 87. The jack nut 90 is secured to the forward end of the cone support 87 and is in threaded engagement with the externally threaded jack shaft 91.

The motor 92 for operating the jack shaft 91 is carried by the hub 58 of the wheel as by the bolts 93. The operating parts of the motor are disposed about the air conduit 94 which is held stationary in that it does not rotate with the wheel. The portion of the motor housing adjacent the wheel hub is hollow and is provided with a duct 95 (Fig. 6) to which the end of the flexible air hose 62 (Fig. 5) is attached. Since the hub 58 rotates relatively to the air conduit 94 when the wheel is rotating an air seal 96 (Fig. 6) is provided adjacent the end of the conduit 94 as well as a labyrinth 97. These parts are maintained in position by the retaining member 98 which is secured to the base of the motor 92 by screws 99.

The motor 92 comprises the rotatable member 100 to which the jack shaft 91 is attached by the screws 101 and the splines 101a.

The end of the air conduit 94 which is remote from the wheel hub may be telescopically slidable with reference to the conduit portion 102 which through an appropriate elbow joint passes upwardly through tubular member 18 within the piston 12 as hereinabove described. An air seal 103 may be provided to prevent escape of air and the conduit 94 may be held in non-rotatable relation with reference to the conduit portion 102 by the spline 104 as indicated in Fig. 7.

Fig. 7 also indicates the manner of carrying the electrical conduits through the air conduit. Within the air conduit 94 there is the insert part 105 which holds in spaced relation the conductor sleeves 106 in which the conductor rods 107 are slidably mounted. The conductor sleeves 106 may be connected to the brush members 108 (Fig. 6) which correspond in number to the number of electrical conductors within the air conduit. The brush members 108 maintain contact with the contact rings 109 for operating the jack motor whenever it is desired to rotate the jack shaft 91 with reference to the jack nut 90. The rods 107 are connected to electrical conductors 110 which may be taken up through the tubular member 18 within the piston 12 as hereinabove described. Since the rods 107 are slidable with reference to the sleeves 106 electrical contact is maintained for actuating the jack motor regardless of the resulting expansion or contraction of the wheel.

The operation of the embodiment shown in Figs. 5 to 7 is essentially the same as described above in connection with the embodiment of this invention shown in Figs. 1 to 4. Whenever it is desired to bring the pneumatic tire 22 into use all that is necessary is to effect rotation of jack shaft 91 relative to the jack nut 90 thereby causing axial movement of the rim member 28 relative to the rim member 25 until the pneumatic tire 22 can be inflated between the tires 23 and 24. At the desired time the pneumatic tire can be inflated. When it is no longer desired to use the pneumatic tire 22 the air can be removed therefrom and the jack shaft 91 can be rotated with reference to the jack nut 90 so as to contract the wheel to the position shown in Figs. 1 and 5.

While this invention has been described in connection with certain typical embodiments thereof it is to be understood that this has been done for illustrative purposes and that the structural details may be varied in utilizing the principles of this invention that have been described hereinabove.

I claim:

1. A vehicle wheel comprising first rim means adapted for securing a first tire thereto, second rim means adapted for securing a second tire thereto, tire holding means adapted for holding a pneumatic tire thereon between first and second tires secured to said first and second rim means respectively, and mounting means for mounting said first and second rim means and said tire holding means for rotation about a common axis of rotation, said first rim means being mounted by said mounting means in axially movable relation to said second rim means for varying the spacing between said first and second rim means between a first position of spacing, adapted to accommodate a pneumatic tire when deflated that is held by said tire holding means between and adjacent first and second tires secured to said first and second rim means, and a second position of greater spacing adapted to accommodate a pneumatic tire when inflated that is held by said tire holding means between first and second tires secured to said first and second rim means respectively.

2. A vehicle wheel comprising first rotatably mounted rim means adapted to carry a first tire secured thereto, second rotatably mounted rim means that is adapted to carry a second tire secured thereto and that is coaxial with said first rim means in axially spaced relation thereto, means for mounting a pneumatic tire between said first and second rim means with one side wall thereof secured to said first rim means and the other side wall thereof secured to said second rim means, and means for varying the axial spacing of said first and second rim means.

3. A vehicle wheel comprising disposed in adjacent coaxial relation a first tire, a second tire and a pneumatic tire between said first and second tires, said pneumatic tire being axially collapsible so as to substantially reduce the lateral thickness thereof when deflated as compared with the lateral thickness thereof when inflated, and mounting means for mounting said first tire, said second tire and said pneumatic tire for rotation about a common axis, said mounting means being adapted to be axially extended and contracted for increasing and decreasing respectively the spacing between said first and second tires by a distance corresponding to the difference in thickness of said pneumatic tire when in inflated condition and when axially collapsed in deflated condition.

4. A vehicle wheel according to claim 3 wherein said pneumatic tire comprises a plurality of annular tread portions with tread material therebetween adapted to fold inwardly when said pneumatic tire is deflated and axially collapsed.

5. A vehicle wheel according to claim 3 wherein said mounting means comprises a plurality of annular rim members which are rotatable about a common axis and which are axially movable relative to each other, said first and second tires being secured to different rim members of said plurality of rim members which are axially movable relative to each other and the opposite side walls of said pneumatic tire being secured to different rim members of said plurality of rim members which are axially movable relative to each other.

6. A vehicle wheel comprising a first rim member mounted for rotation about a fixed axis of rotation and in fixed axial position relative to said axis, first tire holding means that is mounted on said first rim member and is adapted for holding a first tire thereon, a second rim member mounted for coaxial rotation with said first rim member in axially movable relation to said first rim member, second tire holding means that is mounted on said second rim member and is adapted for holding a second tire thereon, a first threaded part held in fixed axial position relative to said first rim member and the axis of the threads of which is disposed in the direction of said axis of rotation, a second threaded part held by said second rim member for axial movement therewith and the threads of which are in engagement with the threads of said first part, and means for rotating one of said threaded parts relative to the other and thereby vary the axial spacing of said first and second rim members.

7. A vehicle wheel comprising a first rotatably mounted rim member, a second rim member carried by said first rim member in axially slidable relation to said first rim member, means interposed between said first and second rim members adapted to prevent relative rotation thereof during axial sliding movement of said second rim member relative to said first rim member, rim moving means operatively connected to said first and second rim members for effecting axial movement of said second rim member relative to said first rim member in either direction, and motor means for actuating said rim moving means to effect axial movement of said second rim member relative to said first rim member in either direction.

8. A vehicle wheel comprising a first rotatably mounted annular rim member, a second rotatably mounted annular rim member carried by said first rim member in axially slidable relation to said first rim member, means interposed between said first and second rim members adapted to prevent relative rotation thereof during axial sliding movement of said second rim member relative to said first rim member, a first threaded part carried in secured relation to said first rim member, a second threaded part which is carried in secured relation to said second rim member, said first and second threaded parts being in threaded engagement with the axis of the threading thereof disposed in the direction of the axis of rotation of said rim members, and means for rotating one of said parts relative to the other and thereby effecting axial movement of said second rim member relative to said first rim member.

9. A vehicle wheel according to claim 8 wherein one of said threaded parts is rotatably driven for rotation relative to the other of said threaded parts by a motor held in secured relation to one of said rim members, said motor being operable to rotate the part driven thereby in either direction whenever it is desired to vary the relative axial positions of said first and second rim members.

10. A vehicle wheel comprising a first rim member adapted for the mounting of a first tire thereon, a second rim member adapted for the mounting of a second tire thereon, means for mounting a pneumatic tire between first and second tires mounted on said first and second rim members respectively with one side wall thereof secured to said first rim member and the other side wall thereof secured to said second rim member, means for mounting said first and second rim members for rotation together about a common axis while permitting axial movement of said second rim member relative to said first rim member, a motor, and means actuated by said motor for effecting axial movement of said second rim member relative to said first rim member.

11. A vehicle wheel comprising a first rim member adapted for the mounting of a first tire thereon, a second rim member adapted for the mounting of a second tire thereon, means for mounting a pneumatic tire between first and second tires mounted on said first and second rim members respectively with one side wall thereof secured to said first rim member and the other side wall thereof secured to said second rim member, means for mounting said first and second rim members for rotation together about a common axis while permitting axial movement of said second rim member relative to said first member, and means for effecting axial movement of said second rim member relative to said first rim member, said last mentioned means comprising a motor secured to one of said rim members, a first threaded part the axis of the threads of which is coaxial with the axis of rotation of said rim members and which is mounted for rotation about the axis of its threads by said motor relative to the rim member to which said motor is secured, and a second threaded part which is in threaded engagement with said first part and which is held in fixed axial position relative to the other of said rim members and is rotatable therewith, whereby by actuation of said motor said first threaded part is rotatable relative to said second threaded part for varying the relative axial positions of said rim members.

12. A vehicle wheel according to claim 11 wherein one of said threaded parts is an externally threaded shaft, and the other of said threaded parts is an internally threaded nut.

13. A vehicle wheel according to claim 11 wherein one of said threaded parts is an externally threaded hollow shaft and which comprises an air line disposed within said hollow shaft, and means for connecting said air line to said pneumatic tire so that said pneumatic tire may be inflated and deflated through said air line.

14. A vehicle wheel comprising a stationary driving motor, a first rim member mounted for rotation about the axis of said motor, a second rim member mounted for rotation about the axis of said motor together with said first rim member and in axially slidable relation thereto, means for rotating said first and second rim members from said driving motor, a second motor secured to one of said rim members, means for actuating said second motor for rotation in either direction, an externally threaded shaft part which is secured to said second rim member, an internally threaded nut part which is secured to said first rim member and which is in threaded engagement with the external threading of said shaft part, means for rotating one of said parts relative to the other in either direction responsive to actuation of said second motor in either direction for effecting axial movement of said second rim member relative to said first rim member, means for securing a first tire in said first rim member, means for securing a second tire to said second rim member, means for mounting a pneumatic tire with one side wall thereof secured to said first rim member and the other side wall thereof secured to said second rim member, and means for effecting inflation and deflation of said pneumatic tire.

15. A vehicle wheel according to claim 14 which comprises annular rim means coaxial with said first and second rim members and in telescopically slidable relation therewith which provides an air-retaining rim surface between said side walls of said pneumatic tire when said second rim member is moved axially away from said first rim member.

16. A vehicle wheel comprising a first tire rim mounted for rotation about the wheel axis, a second tire rim mounted for rotation about the wheel axis in axially movable relation to said first tire rim whereby the spacing between said tire rims may be varied, and annular rim means which occupies the space between said first and second tire rims when said tire rims are moved to increase the spacing therebetween and which is secured to said first and second tire rims in axially slidable relation therewith for telescopic movement relative thereto upon movement of said second tire rim relative to said first tire rim to vary the spacing between them.

17. A vehicle wheel comprising first rim means adapted for securing a first tire thereto, second rim means adapted for securing a second tire thereto, tire mounting means for mounting a pneumatic tire thereon between first and second tires secured to said first and second rim means respectively, mounting means for mounting said first and second rim means and said tire mounting means for rotation about a common axis of rotation, said second rim means being mounted by said mounting means in axially movable relation to said first rim means for varying the spacing between said first and second rim means, a hub member secured to said second rim member, an externally threaded shaft part secured to said hub member in coaxial relation with respect to said rim members, an internally threaded part secured to said first rim means in threaded engagement with said shaft, a motor secured to one of said rim means adapted to rotate one of said parts relative to the other for varying the spacing between said rim means, air conduit means comprised within said shaft part and comprising longitudinally telescoping parts, the terminus of one of which is maintained adjacent said hub member and the terminus of the other of which is attached to a fixed air-line part in communication with a source of compressed air, and a flexible air line communicating between the interior of said pneumatic tire and said terminus of said telescoping part that is maintained adjacent said hub member.

18. A vehicle wheel according to claim 17 wherein electrical conductor means having longitudinally slidable contact members are disposed within said air conduit means, said electric conductor means being comprised in a circuit for supplying electric current to said motor.

19. A vehicle wheel comprising a first rim member mounted for rotation about a fixed axis of rotation, a second rim member mounted for coaxial rotation with said first rim member in axially movable relation to said first rim member, an axially disposed driven member rotatably mounted for rotation about said fixed axis, rim moving means secured to said first member and operatively connected to said second member for effecting axial movement of said second rim member relative to said first rim member between a first position and a second position substantially spaced axially from said first position, motor means for actuating said rim moving means to effect axial movement of said second rim member relative to said first rim member in either direction between said first and said second positions, and power transmitting means for transmitting rotational movement of said driving member about said fixed axis to said first and second rim members for rotation of said first and second rim members at the same speed about said fixed axis when said second rim member is in said first position relative to said first rim member and is in said second position relative to said first rim member, and means for preventing relative rotation of said first and second rim members when said second rim member is in said first position relative to said first rim member and is in said second position relative to said first rim member.

References Cited in the file of this patent

UNITED STATES PATENTS

| | | |
|---|---|---|
| 1,802,773 | Nelson | Apr. 28, 1931 |
| 2,627,440 | Klein | Feb. 3, 1953 |